Feb. 16, 1971     T. D. LINN     3,564,533
TRIANGULAR GRAPHIC DIGITIZER
Filed Oct. 6, 1966     2 Sheets-Sheet 1
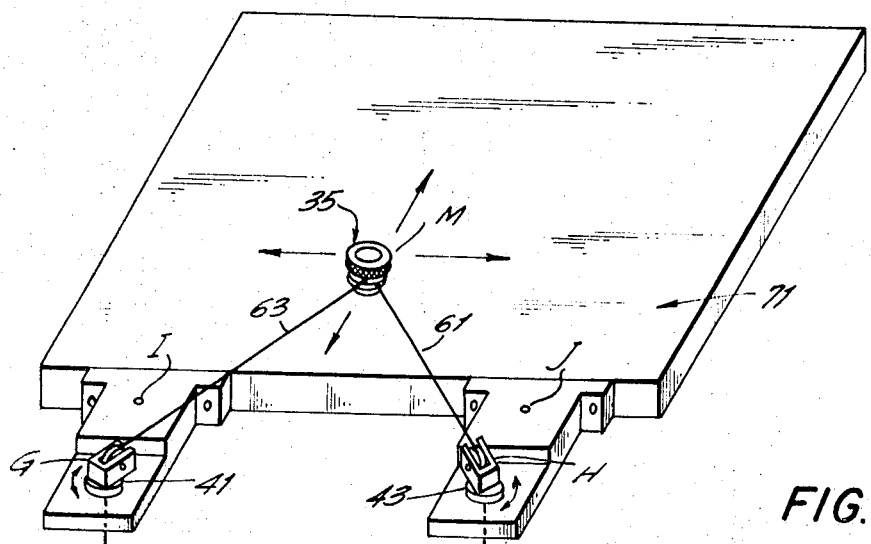
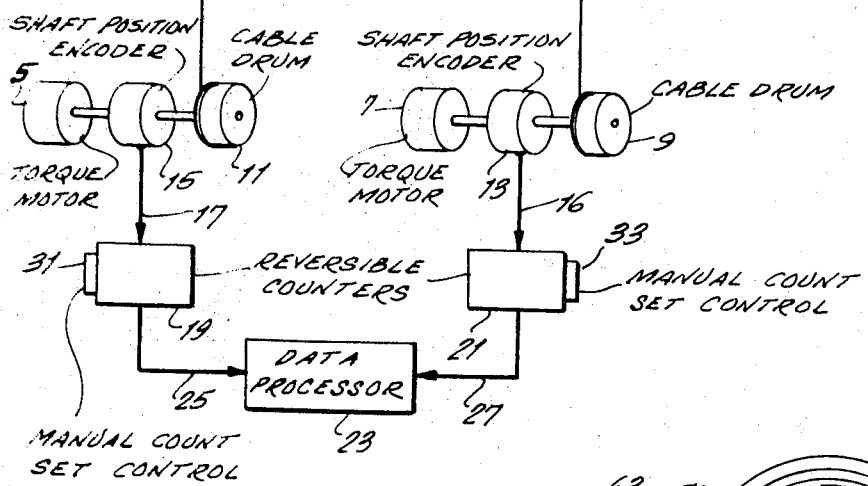
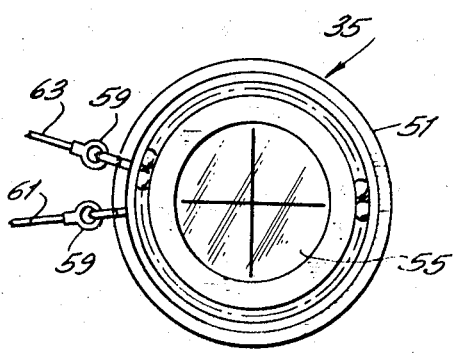
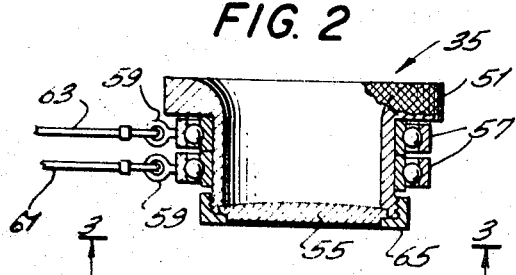
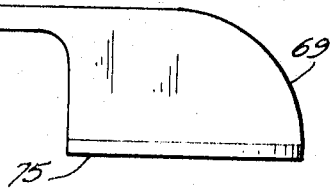
INVENTOR.
THOMAS D. LINN
Amster & Rothstein
ATTORNEYS United States Patent Office 3,564,533
Patented Feb. 16, 1971

3,564,533
TRIANGULAR GRAPHIC DIGITIZER
Thomas D. Linn, 100 Woodland St.,
Holliston, Mass. 01746
Filed Oct. 6, 1966, Ser. No. 584,747
Int. Cl. H03k *13/02*
U.S. Cl. 340—347                                        10 Claims

ABSTRACT OF THE DISCLOSURE

A triangular graphic digitizer. Each of two cables is pivotally connected at one end to a common handpiece. The other end of each cable is wound around a respective encoder whose output is proportional to the distance of the cable to the handpiece. Each cable passes over a pulley which is mounted to swivel around an axis perpendicular to the plane of the working surface. The swiveling pulleys insure that the lengths of the cables represent the true position of the handpiece with no errors arising because of changes in the directions of the cables.

---

This invention relates to graphic digitizers and more particularly to a triangular coordinate graphic digitizer.

A graphic digitizer is a device used to obtain, in digital form, the relative positions of points on a graphic image. Graphic digitizers are used for many purposes. Typical uses are the construction of maps from aerial photographs; the control of an automatic machine tool from a manually prepared drawing and the digital computer analysis of oscillograph records. Graphic digitizers are finding increased use due to the rapidly expanding digital computation and control technology.

There are two general types of graphic digitizers in present use. The first is based upon rectangular coordinates wherein the digital information obtained represents the distance from the unknown point to two fixed datum lines arranged at right angles to each other. One implementation uses a carriage parallel to the Y axis and movable in the X direction on guides parallel to the X axis. A saddle carrying a pointer or crosshair magnifier is mounted on guides provided on the carriage and movable in the Y direction. When the pointer or crosshair is located over an unknown point, the positions of the saddle and carriage on their respective guides are indicative of the relative position of the points or crosshair on the graphic image. Various commonly used techniques are employed to translate the position of the movable members to digital form. A second implementation of this first type of graphic digitizer utilizes two wires stretched parallel to the X and Y axes respectively. These two wires are moved independently by two hand cranks. Guides must be provided to accurately guide the paths of the wires. The two wires are individually moved until the intersection falls over the unknown point.

The second type of graphic digitizer is based upon polar coordinates wherein the digital information obtained represents the distance from the unknown point to a fixed point, and the angle formed by a line joining the two points and a datum line passing through the fixed point. One implementation employs a telescoping arm carrying the pointer or crosshair coupled to a fixed pivot. The pointer is moved to the unknown point by telescoping the arm in or out and rotating it about the pivot. The angle of the arm and its length are indicative of the position of the unknown point.

All of the prior art systems share one or more of the following faults:

(a) High cost due to the many parts required or the high precision necessary for some of these parts.

(b) High inertia to be overcome by the operator.

(c) Obstruction of the view by carriage assemblies.

(d) Two separate positioning operations required for each point to be digitized.

(e) Limited flexibility since the digitizing area is fixed for a given model.

(f) Extreme difficulty in making accurate angular measurements.

It is a general object of this invention to provide a graphic digitizer which overcomes all of the above-noted disadvantages of prior art systems.

The illustrative embodiments of my invention are based upon a triangular coordinate scheme wherein the digital information obtained represents the distances from an unknown point to two fixed points. The triangular co-ordination technique itself is well known and used in such fields as surveying and navigation. However, it had been believed that the technique was unsuitable for graphic digitizer applications.

Since rectangular and polar coordinates are those generally used in technology, it appears, at first glance, that it would be difficult to obtain meaningful results from triangular data. In the great majority of applications, however, the digital data must be processed by a digital computer before it is useful. The task of translating triangular coordinates to another form is a minor one for a computer. (Translation and rotation programs are frequently required, for example, even when the data is originally in rectangular or polar coordinates.) Consequently, the additional translation step which may be necessary with the "triangular" graphic digitizer of my invention is not at all difficult to execute.

In accordance with the principles of my invention, a handpiece containing a pointer or crosshair is connected to two cables or two rigid arms. In the embodiment having two cables, each of the cables is passed around a respective pivot point, located outside the digitizing area, and then wound on a respective take-up drum. A torgue motor is coupled to the shaft of each drum tending to wind up the respective cable. Also coupled to the drum shafts are respective shaft position encoders. Each of these encoders provides a digital output proportional to the angular change in the position of the respective shaft. Since each drum is of constant diameter, a change in the handpiece location produces a linearly proportional change in shaft angle. Thus, each encoder output is a function of the changing position of the handpiece relative to the respective pivot. When the encoder outputs for each shaft are properly accumulated in a counter and when the counter is calibrated initially to the actual distance between the handpiece and the respective pivot, the counter will at all times represent the actual distance between the handpiece and the pivot. Since the two pivots are located a fixed distance apart and in a fixed location relative to the digitizing area, the lengths of the three sides of a triangle joining the unknown point and the two pivots may be determined. Successive sets of data (such as the information on the aforementioned lengths), by means of standard trigonometric calculations, can be used to determine the relationship between many unknown points on the graphic image. The position of any individual point may be reconstructed graphically by striking circular arcs about the pivots. The respective radii being equal to the respective readings for the point. The intersection of the arcs defines the position of the point. Two such intersections will generally occur, one on each side of the line joining the pivots. In actual practice, digitizing will be restricted to one side of the line or it will be known by the operator on which side the digitizing is being performed.

In the embodiment of my invention having two rigid arms rather than two flexible cables, each of the arms is pivotally connected to the handpiece. The other end of each arm passes through a respective pivot, and has a series of teeth. Each pivot has a pinion which is rotated when its teeth mesh with the teeth of the respective arm as the arm moves through the pivot. Rotary encoders attached to the pinions provide outputs, similar to those obtained in the first embodiment, indicative of changes in the lengths of the respective arms between the pivots and the handpiece.

The advantages of systems constructed in accordance with principles of my invention are many. In the cable embodiment, the handpiece is free to move rapidly in any direction due to the low inertia of the handpiece and the negligible tension on the cables. The cable, pivot and drum assemblies are inexpensive to construct and the two assemblies can be identical, leading to lower manufacturing costs. The system is flexible. A wide range of digitizing areas can be accommodated simply by employing relatively long cables and by setting the pivots to correspond to the area of interest. The digitizer may be made portable due to the small volume of the mechanism and its independence of the digitizing surface. The small handpiece is the only obstruction to the operator's view. In the rigid arm embodiment, there is slightly more inertia to be overcome. This is offset in practice, however, by reduced manufacturing costs because of the reduced number of parts required.

It is a feature of my invention to provide in a graphic digitizer a handpiece connected to two distance-measuring mechanisms which are constrained to pass through two pivot points.

It is another feature of my invention to determine the position of the handpiece from the lengths of two distance-measuring mechanisms between the respective pivot points and the handpiece.

Further objects, features and advantages of my invention will become apparent upon consideration of the following detailed description in conjunction with the drawing in which:

FIG. 1 depicts symbolically an illustrative embodiment of my invention;

FIG. 2 is a cross-sectional view of the handpiece shown at 35 in FIG. 1;

FIG. 3 is a bottom plan view of the handpiece;

FIG. 4 depicts an alternative stylus handpiece;

Figure 5:
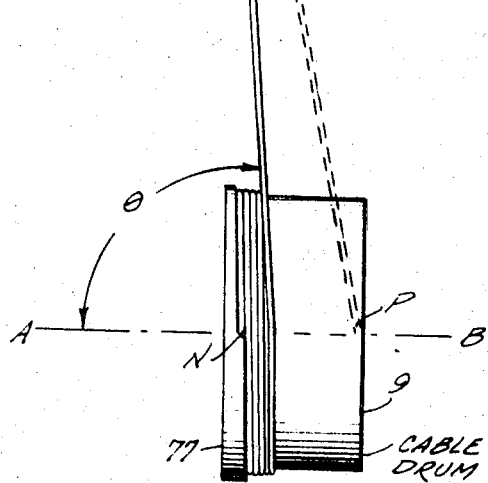
FIG. 5 depicts in greater detail one of the pivot drum assemblies of FIG. 1.

Referring to FIG. 1, two pivot assemblies, 41 and 43 are attached to a plotting or digitizing surface 71. As shown in the drawing, each of these pivots consists of a grooved pulley mounted in a swivel which is free to rotate about a vertical axis. Cables 61 and 63 pass over respective pulleys and are attached at one end to a plotter or handpiece 35, and at the other end to respective cable drums 9 and 11. It is the handpiece which is moved over the digitizing surface. The swivel action of each pivot permits the handpiece to be moved in a circular arc about the pivot without changing the length of cable wound on the respective drum. The two pivot assemblies are mounted such that cables 61 and 63 lie parallel to the surface 71 when the handpiece is resting on the surface. Thus when the handpiece is moved toward or away from a respective pivot, the length of cable removed from or added to the drum will correspond exactly with the difference in distance between handpiece and pivot in the surface plane.

Coupled to each cable drum is a torque motor 5 or 7. Torque motors of both electrical and mechanical types are commercially available. Each of the two torque motors provides a sufficient torque such that the respective drum takes up the slack in the attached cable. While the torque is sufficient to take up the slack, it is small enough to permit easy movement of the handpiece when the handpiece is moved so as to unwind the cable from the drum.

Each of the drums is coupled by a common shaft to a respective one of rotary shaft position encoders 13 and 15. Transducers of this type are well known in the art and any of many commercially available units may be used. In the illustrative embodiment of the invention, each of the encoders provides a series of pulses on the respective output conductor 16 or 17, proportional in number to the angular change of its shaft and having a polarity dependent upon the direction of rotation. A typical ratio would be 2000 pulses per turn. If a drum is chosen of such a diameter that one turn of the cable corresponds to 4 inches, each pulse would correspond to 4 divided by 2000, or .002, inch. Thus if the handpiece is moved closed to pivot 41 such that distance MG is one inch less than before the motion, drum 11 will rotate one-quarter turn and encoder 15 will generate 500 negative pulses. Correspondingly, encoder 15 generates 500 positive pulses when the handpiece is moved one inch further away from the pivot.

Each of the encoder outputs is directed to one of the reversible counters 19 and 21. Reversible counters of this type are commercially available and may be electromechanical or electronic. Each of these counters exhibits a count equal to its previous value plus the total number of positive pulses received, and minus the total number of negative pulses received. Attached to each of the respective counters is a manual count set control 31 or 33. These manual count set controls are provided in the illustrative embodiment of the invention to establish the initial values of the respective counters. This is accomplished for counter 19 by placing the handpiece 35 over point I. A count, corresponding to the distance IG, is then established in the counter 19 by the manual count set control. The count in counter 21 is similarly established for distance JH by control 33 when the handpiece is placed over point J. Once properly calibrated, the respective counts in counters 19 and 21 are representative of the distances GM and HM respectively, for any subsequent position of the handpiece.

Since the distance GH is fixed by the attachment of the pivot assemblies to the digitizing surface, two unique triangles are established, the three sides of which are known, for each pair of counts represented in the counters. The two triangles have a common base GH, and the vertex M of each must lie in the plane of the surface 71 at the intersection of two circular arcs, corresponding to the respective counts, struck about respective pivot centers G and H. It will be observed that point M may lie at one of two unique locations, one on each side of line GH. In practice, the active digitizing area at any one time will be restricted to one side of line GH (e.g., the side including surface 71) and thus a unique location is established for point M by any given set of readings taken from counters 19 and 21.

The two counters are shown feeding into a data processor 23 for translation purposes. The pivot center distance GH need be supplied to the data processor only once provided the pivot assemblies remain fixed. The data obtained from the counters could alternatively be recorded manually or automatically on media such as punched cards, punched paper tape or magnetic tape.

All of the basic elements used in the system are commercially available, and together they are much less costly than prior art graphic digitizers.

The cables 61 and 63 are preferably unaffected by tempearture and humidity changes. They must, of course, be inelastic. System accuracy is not affected by long term changes in cable length. Calibration of the counters at points I and J, respetcively, correctly establishes the cable lengths from handpiece to pivots. At points other than the calibration points, each length is determined by a drum circumference which is not subject to change.

The system is highly flexible. The pivot assemblies may be spaced in accordance with the area to be digitized. The larger the area, the greater should be the spacing. It is only necessary to accurately measure the distance between the centers of the pivots and record it for later processing. The pivots may be arranged in any attitude that is convenient. They may be readily attached to existing devices such as light tables and the film viewers. The system, in the form described, may be used for example to measure holes or slots in any single plane of a fabricated part. This is a significant adavntage when the part is too heavy or unwieldy to be moved to a more conventional measuring machine.

One of the pivot assemblies, a single counter and the handpiece may be used alone for making straight-line measurements.

It should be noted from FIG. 1 that the entire digitizing surface is visible, which is a decided advantage over prior art machines in which a considable portion of the viewing area is blocked. The system has a high accuracy potential for a given set of manufacturing tolerances since there are very few parts contributing to the measurement.

A handpiece suitable for the system is shown in FIGS. 2 and 3. The handpiece consists of a short hollow cylinder 51 having a lens 55 on which are scribed accurately centered crosshairs. This combination enables the operator to accurately position the handpiece over unknown points or lines.

The cylinder rests on a low friction ring 65 which facilitates its movements along the digitizing surface. Each of swivels 59 is attached to a respective one of the cables 61 and 63. The swivels are mounted as low as possible on the handpiece to reduce error due to tilt of the handpiece. The swivels are attached to the handpiece by bearings 57 to facilitate free motion about the vertical axis of the handpiece. Under cable tension, the swivels will align in such a way that imaginary extensions of the cables will pass through the axis of the handpiece.

Many variations of the handpiece are possible. A stylus type is illustrated in FIG. 4. A pointed stylus 67 is attached to a handpiece 69. The handpiece is supported level with the digitizing surface of a low friction shoe 75 which facilitates motion over the surface. Two swivels 73, free to rotate about the axis of the stylus, are attached to respective cables 61 and 63. The operation of this handpiece is similar to that of the handpiece of FIGS. 2 and 3.

It is preferable that a mechanism be provided to insure that each cable wind along a predictable helix on the respective drum. One such mechanism is depicted in FIG. 5. A plate 77, the face of which is machined with a helical angle coresponding to the pitch diameter of the cable, is attached to the drum. The drum is positioned along its axis A–B such that the cable makes an angle $\theta$ less than 90° at the starting turn. As additional turns are applied, the angle $\theta$ decreases. There is always a component of the tension force tending to force each turn against the previous turn. Since the first turn follows the helical shape of plate 77, all turns will have the same length.

An examination of FIG. 5 shows that a slight triangulation error is introduced by the drum system. Length H–P at the last turn is greater than length H–N at the first turn. As is apparent, this error can be minimized in two ways—by making the cable diameter small and by making the relative distance between pivot and drum large.

Figure 6:
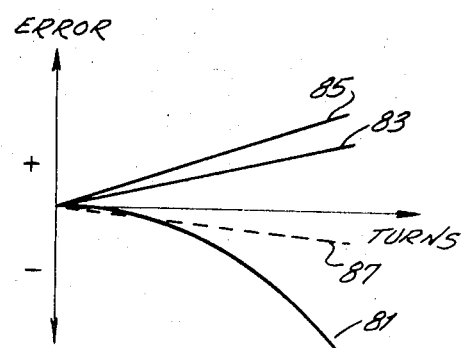
FIG. 6 is an error plot of several system parameters.
Figure 7:
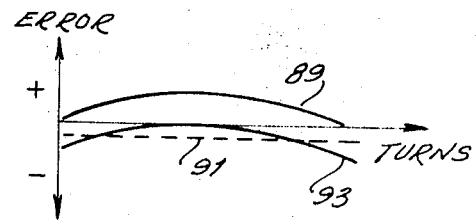
FIG. 7 is a corrected error plot.

A procedure for compensating the remaining triangulation error and variations in drum and cable diameter as well, is as follows. An error plot is shown in FIG. 6 which illustrates the effect upon a counter reading as a function of several variables. Curve 81 represents the triangulation error. This error is considered negative since the observed change in the reading of the counter, assuming the correct drum and cable diameter, will be less than the actual displacement of the handpiece as the number of turns on the drum increases. Curve 83 represents the effect of a uniformly undersized drum. All values on this curve are positive since a greater change in the count will result from a given motion of the handpiece than for a correctly sized drum. Curve 85 represents the effect of a uniformly undersized cable. It is similarly in the first quadrant and linear. A compensating adjustment is introduced by the clockwise pivoting of axis A–B in FIG. 5 about point N, in a direction to decrease angle $\theta$. The effect of this adjustment is shown by the dotted line 87 in FIG. 6. This adjustment is set such that the sum of 81 and 87 exactly compensates for the sum of 83 and 85 at the last turn. This produces the error curve 89, shown in FIG. 7. It is apparent that the peak value of this error is fixed by the geometry of the pivot-drum system. Since it is fixed by design, it can be balanced into an equal positive and negative error by introducing a negative offset, such as curve 91. The resultant is 93. This can be readily accomplished by displacing the calibration points I and J in FIG. 1 a distance equal to one-half the peak error. Thus, with one simple adjustment, great accuracy can be achieved using standard parts having broad manufacturing tolerances.

Figure 8:
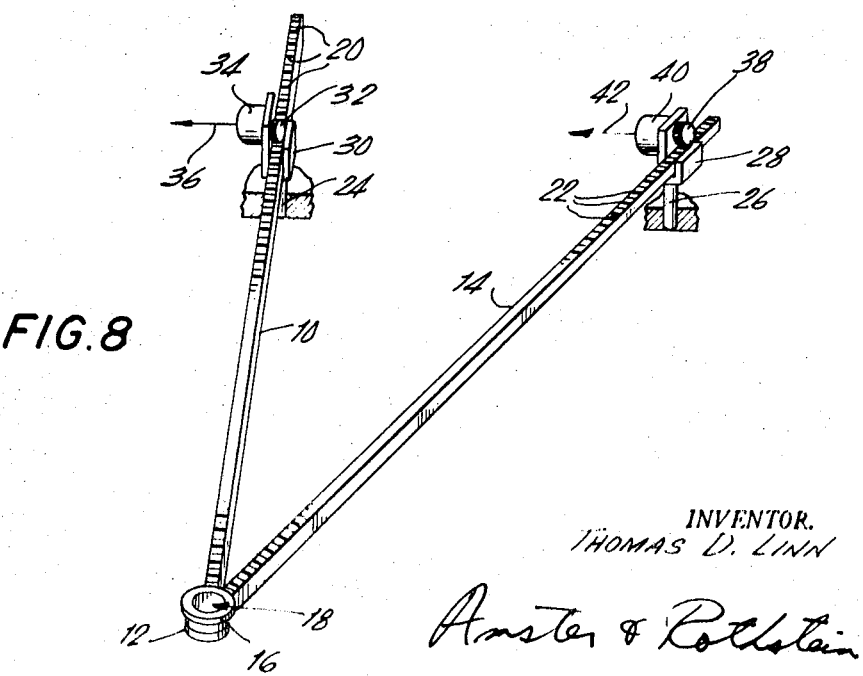
FIG. 8 depicts another illustrative embodiment of my invention, showing mechanisms which may be substituted for the cables and drums of FIG. 1.

In the embodiment of FIG. 8, shown only schematically, two rigid arms are employed rather than two tensioned cables. Arm 10 is connected to handpiece 18 by swivel 12, and arm 14 is connected to the handpiece by swivel 16. Pivots 24 and 26 are secured to the digitizing surface. Each of the pivots includes a respective guide 30 and 28 through which a respective one of arms 10 and 14 passes. The pivots in this embodiment are also mounted on the digitizing surface such that they may rotate freely about a vertical axis. As the handpiece 18 is moved the pivots 24 and 26 change orientation and the arms 10 and 14 move back and forth through the guides 30 and 28 respectively.

Arm 10 also includes a series of teeth 20 and arm 14 includes a similar series of teeth 22. Each pivot has attached thereto a pinion 32 or 38, each of which is in turn attached to an encoder 34 or 40. As an arm moves through a pivot, the respective pinion is rotated by the teeth in the arm. The angular rotation of each pinion is thus dependent upon the change in length of the arm between the pivot and the handpiece. The output of each encoder is shown only symbolically at 36 and 42. The output signals are processed as are the output signals in the first embodiment. Other features similar to those described with reference to the first embodiment, such as manual encoder preset controls, may be incorporated in a system designed along the lines illustrated by FIG. 8.

This alternate embodiment of the invention presents a little more inertia to handpiece movement as a result of the mass of the two rigid arms. However, the number of parts required is considerably smaller than the number required in the first embodiment of the invention.

Although the invention has been described with reference to two particular embodiments, these embodiments are merely illustrative of the application of the principles of the invention. Absolute encoders, which generate unique numbers for each discrete position of the handpiece, can be used to eliminate the need for accumulating counters and the concomitant calibration procedure. Translation of linear to rotary motion for encoding purposes can be achieved by thin sprocket tape cables driving toothed sprockets coupled to the encoders. Encoding can be done directly from a magnetically recorded tape cable, or with the use of photoelectric techniques from a thin tape cable in which equally spaced holes are punched. Tension can be supplied to a cable by a suspended weight attached to the end of the cable. The cable can be given one or two turns upon a drum and the suspended weight will rise and fall as the handpiece is moved.

To measure the distances between the pivots and the handpiece it is possible to transmit electrical signals along two conducting cables and to determine the length of each cable between the respective pivot and the handpiece by measuring the time period between the application of a pulse and its return. It is also possible in either embodiment of the invention to transmit sonic waves along the cables or rigid arms, and to measure the elapsed time between the transmission of the wave and its return after reflection from the handpiece. Also, laser interferometers, common to the art, may be used to measure the distances between two fixed points and a handpiece which is free of any attachments.

Thus it is to be understood that numerous modifications may be made in the illustrative embodiments of the invention and other arrangements may be devised without departing from the spirit and scope of the invention.

What I claim is:

1. A graphic digitizer comprising first and second cable supply means for supplying first and second cables and for producing a slight tension therein, a digitizing surface, a handpiece movable on said digitizing surface, means for pivotally connecting the free ends of said first and second cables to said handpiece such that said cables extend to the same intersection point relative to said handpiece independent of the position of said handpiece and the directions of said cables, first and second swivel means each attached to said digitizing surface for swiveling around a respective axis substantially perpendicular to said digitizing surface, each of said swivel means including feed-out means for feeding out a respective one of said cables in a direction substantially parallel to said digitizing surface, each of said swivel means and the associated feed-out means being operative to permit movement of said handpiece in an arc around the axis of the swivel means without changing the length of the respective cable between the handpiece and the respective cable supply means, and first and second means responsive to changes in the lengths of said cables supplied by respective ones of said first and second cable supply means for representing the position of said handpiece on said digitizing surface.

2. A graphic digitizer in accordance with claim 1 wherein the feed-out means included in each of said swivel means is pulley means mounted for rotation around an axis parallel to said digitizing surface for carrying the respective one of said cables.

3. A graphic digitizer in accordance with claim 2 wherein said first and second cable supply means include cylindrical drums for winding said respective cables therearound, and said first and second representing means are responsive to changes in the angular positions of said drums.

4. A graphic digitizer in accordance with claim 3 wherein each of said first and second representing means includes means for providing electrical signals of either polarity indicative of a drum rotation in either direction, and reversible counter means responsive to said electrical signals for representing a numerical count.

5. A graphic digitizer in accordance with claim 1 wherein said first and second cable supply means include cylindrical drums for winding said respective cables therearound, and said first and second representing means are responsive to changes in the angular positions of said drums.

6. A graphic digitizer in accordance with claim 5 wherein each of said first and second representing means includes means for providing electrical signals of either polarity indicative of a drum rotation in either direction, and reversible counter means responsive to said electrical signals for representing a numerical count.

7. A graphic digitizer in accordance with claim 6 further including means for manually setting the count in each of said first and second counter means in accordance with preestablished measurements when said handpiece is positioned at predetermined points on said digitizing surface.

8. A graphic digitizer in accordance with claim 1 wherein said first and second representing means represent the distances of said handpiece from respective first and second fixed points, and further including means for determining the position of said handpiece on said digitizing surface in accordance with the distances represented by said first and second representing means and the distance between said two fixed points.

9. A graphic digitizer in accordance with claim 1 further including first and second helical guide means connected to respective ones of said cylindrical drums for controlling said first and second cables to be wound up helically on said cylindrical drums.

10. A graphic digitizer in accordance with claim 1 further including means responsive to said first and second representing means for determining the position of said handpiece in accordance with the distance between and the orientation of said first and second swivel means.

References Cited

UNITED STATES PATENTS

| | | | |
|---|---|---|---|
| 201,473 | 3/1878 | Wolbrecht | 33—IMP |
| 672,631 | 4/1901 | Tiffany | 178—18 |
| 2,276,302 | 3/1942 | Guttmann | 33—125 |
| 2,413,300 | 12/1946 | Dunn et al. | 340—282 |
| 3,184,740 | 5/1965 | Huckabay et al. | 33—IMP |
| 3,230,622 | 1/1966 | Birrell | 33—1 |
| 3,271,564 | 9/1966 | Rosenfeld et al. | 340—347 |
| 3,355,730 | 11/1967 | Neasham | 178—18 |
| 3,372,485 | 3/1968 | Mangus et al. | 33—1 |

OTHER REFERENCES

Cartesion Coordinate Planar Drive System, RCA TN 339, by Ross Whistler, November 1959.

MAYNARD R. WILBUR, Primary Examiner

J. GLASSMAN, Assistant Examiner

U.S. Cl. X.R.

33—1